United States Patent
Rayman (10) Patent No.: US 6,532,718 B2
(45) Date of Patent: Mar. 18, 2003

(54) METHOD OF SHIPPING VERY LARGE TIRES

(75) Inventor: William Earl Rayman, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 5 days.

(21) Appl. No.: 09/909,366

(22) Filed: Jul. 19, 2001

(65) Prior Publication Data

US 2003/0014943 A1 Jan. 23, 2003

(51) Int. Cl.⁷ .......................... B65B 27/06; B65B 63/02
(52) U.S. Cl. ............................. 53/399; 53/438
(58) Field of Search .................. 53/399, 409, 436, 53/438, 528, 529, 582, 204; 100/2, 3, 12; 206/303–304.2, 408, 597; 152/187, 209.6

(56) References Cited

U.S. PATENT DOCUMENTS

| | | | |
|---|---|---|---|
| 2,659,484 A | * 11/1953 | Averill | 206/304 |
| 2,690,253 A | * 9/1954 | Francois | 206/303 |
| 3,012,663 A | * 12/1961 | Thorne | 206/304 |
| 3,087,526 A | * 4/1963 | Barassi et al. | 152/176 |
| 3,224,482 A | * 12/1965 | Barassi et al. | 152/176 |
| 3,578,052 A | 5/1971 | Petersons | |
| 3,619,966 A | 11/1971 | Goldsberry | |
| 3,822,526 A | 7/1974 | Black | |
| 3,850,295 A | 11/1974 | Black | |
| 3,897,814 A | * 8/1975 | Grawey | 152/187 |
| 3,942,637 A | * 3/1976 | Glennie | 206/303 |
| 3,963,066 A | * 6/1976 | Schwartz et al. | 152/187 |
| 4,150,745 A | * 4/1979 | Williams et al. | 206/303 |
| 4,314,597 A | * 2/1982 | Zrostlik et al. | 157/1.11 |
| 4,351,380 A | * 9/1982 | Pilliod et al. | 152/169 |
| 4,550,827 A | 11/1985 | Watts et al. | |
| 4,678,084 A | * 7/1987 | Maker et al. | 206/408 |
| 5,056,662 A | * 10/1991 | Lasenby et al. | 206/408 |
| 5,201,427 A | 4/1993 | Dowty | |
| 5,321,931 A | 6/1994 | Bluteau | |
| 5,544,578 A | 8/1996 | Keller et al. | |
| 5,584,622 A | * 12/1996 | Dickerson, Sr. | 410/10 |
| 5,816,142 A | 10/1998 | Keller et al. | |
| 6,095,731 A | * 8/2000 | Minakami et al. | 410/10 |
| 6,324,814 B1 | 12/2001 | Rayman | |

FOREIGN PATENT DOCUMENTS

GB      2073109 A   * 10/1981

* cited by examiner

Primary Examiner—Stephen F. Gerrity
(74) Attorney, Agent, or Firm—David L. King (57) ABSTRACT

A method for shipping very large tires which are typically used on very large vehicles such as earthmovers. The tires can be shipped so that less shipping and storage space is required.

8 Claims, 5 Drawing Sheets

METHOD OF SHIPPING VERY LARGE TIRES

TECHNICAL FIELD OF THE INVENTION

This invention relates to methods for shipping pneumatic tires typically for use with very large vehicles such as earthmoving vehicles.

BACKGROUND OF THE INVENTION

The pneumatic tires, which are the subject of the method of the present invention, are very large tires (greater than 120 inch outside diameter (OD)) generally designed for use on very large vehicles, generally off-the-road (OTR) vehicles such as earthmovers and large-capacity mining trucks (e.g., 300 short tons or more). These very large tires and vehicles are generally utilized at long-term mining or construction sites such as rock quarries, mines, foundries, major tunnel/roadway construction, dams/dikes, and the like. The very large vehicles are generally too large to transport to the work site normally, and are therefore often shipped in pieces to the work site where the pieces are assembled/welded together for use. As modern construction vehicles have evolved to large and larger sizes, their tires have also grown to the point where conventional shipping of the tires becomes difficult. For example, an existing design of 360 ton (32,6530 kg) truck requires pneumatic tires of 154 inch diameter (3.91) meter which is considered to be the maximum size tire reasonably possible to ship by rail or roadway means in the United States. Tire weight is another consideration, as very large tires can weigh 8,000 pounds (3,628 kg) to 15,000 pounds (6,803 kg) or more per unmounted tires. The industry would like to progress to even larger, 400 ton (362,812 kg) or 450 ton (408,163 kg) trucks with correspondingly larger tires of 160 inch (4.07 meter) diameters or more. Depending on local limitations of shipping means (such as tunnel/bridge clearances and roadway weight limits), even somewhat smaller ones of the "very large tires" may pose significant problems, and may therefore require extraordinary transport means such as by helicopter.

Another problem is storage of the very large tires at the work site. As tires become larger, more and more space is required for storage. Also, if operating conditions are particularly harsh, or if shipping of replacement tires "on demand" is not practical, then increased numbers of spares must be stocked, further increasing the storage space needed. Furthermore, some job sites require different tread designs for different operating conditions. For example, wide treads with deep cleats may be needed for muddy conditions. Given the time consuming nature of the existing tire-changing methods, changing tires to obtain optimum tread patterns is not always feasible.

Finally, even if driving tires and steering tires on the very large vehicles are the same overall size, the tread patterns of the two types of tires need to be different for most effective operation. This again adds to the number of replacement tires, which must be stored at a work site.

There is therefore a need for a method of shipping very large tires that allows for the employment of more conventional shipping means, and there is a desire to reduce the work site storage requirements as well as to improve the efficiency of the very large tire changing process.

Although tires having replaceable treads are known in automotive/motorcycle and conventional truck tire applications, it is not until recently that tread belt tires have been developed to meet the unique requirements of very large pneumatic tires for very large vehicles. U.S. patent application Ser. No. 09/424,089 entitled TIRE WITH IMPROVED REMOVABLE TIRE TREAD BELT to Rayman, having a common assignee with the present invention, of which this invention is related, discloses a tire with an improved removable tire tread belt for use on large earthmover vehicles. This tread belt tire (also called a "track belt tire") "is constructed of a removable tread belt assembly mounted to the outer circumferential surface of an inflatable tire carcass. A unique track belt design restrains the track from expanding while simultaneously improving the secure mounting of the track to the carcass and providing improved penetration protection. Also, the improved track belt will maintain a flatter tread profile which in turn will improve tread life and durability."

A predecessor version of removable treads or tracks for very large tires is discussed in U.S. Pat. No. 4,351,380, wherein certain prior art track belt tire assemblies comprise a plurality of ground-engaging "shoes" spaced about the periphery of the supporting structure. The heavy loads on the "shoes" result in great stresses being developed that sometimes lead to premature tire failure. The U.S. Pat. No. 4,351,380 is directed to an improved track belt assembly which comprises a plurality of shoes spaced about the periphery of a load-supporting structure and secured to a reinforcing belt structure disposed on the side of the shoe opposite the ground-engaging side thereof A body of prior art exists for tires with removable tread belts (see, for example, U.S. Pat. Nos. 3,897,814; 3,224,482; 3,087,526; and British Patent G.B. 2,073,109). However these patents were directed toward the addressing of various issues related to tires used by predominantly roadway vehicles such as automobiles and trucks. Examples of these issues include: varying cord spacing to reduce wear of the outer tread belt edge for "enhanced service life and lower manufacturing cost"; improving transverse bending for "better riding comfort and improved road holding ability"; and linking separate tread rings to improve "road-holding capabilities and . . . silent riding." Accordingly, the prior art has varied the quantity, shape, placement and spacing of tread rings, reinforcing belts, inextensible cords, and interlocking grooves in the tire carcass and tread belt, but these variations have not been adequate to address the special needs of off-the-road vehicle tires, nor of very large tires in general.

The concept of a two piece tire construction provided a novel way which the tread belt and the tire carcass could be separately shipped and stored. U.S. Pat. No. 6,324,814 describes a unique way of compressing the tread belt against a spacer creating an elongated oval for shipping. Additionally the carcass could be compressed to facilitate shipping, each component being separately restrined for shipment.

While this approach facilitates inventory problems of different tread types, and can more compactly permit shipping. The present invention permits an even more efficient method of shipping such tires.

There are still unsolved problems, relating to a pneumatic tire and tread belt assembly, concerning shipping, storage, inventory, and changing of very large tires on very large vehicles.

SUMMARY OF THE INVENTION

The present invention relates to an improved method for shipping and storing very large pneumatic tires, which are used on very large vehicles such as earthmover vehicles. Very large tires of conventional construction are sometimes over 13 feet (4 meter) in height and approximately 8,000 pounds (3,628K) to 15,000 pounds (6,803K) in weight and proposed very large truck designs require even larger tires. The size and weight of the very large conventional tires presents significant problems in shipping, storage and tire changing.

The method of shipping very large diameter tires having unrestrained diameters (OD) over 120 inches (3.05 meters) had the step of holding at least one diameteral size of the tire 10 in a compressed state thereby reducing the distance from the unrestrained diameter (OD) of over 120 inches to a maximum distance (H) or less as measured across at least two opposing diameteral sides of the tires. The compressed distance H being at or below standard widths for commercial trucking. The compressed state tire can be placed on a commercial standard width flat bed trailer or within a commercial standard size shipping container for shipment. If only one side of the tire is compressed the assembly may be shipped vertically allowing the compressed side to act as a base assuming the height is sufficiently small to allow bridge clearance. Alternately, the tires may be shipped horizontally laying on the sidewalls and stacked vertically.

If the tires are sufficiently large, the tires may be restrained along two diametrically opposed sides thus compressing the encircled carcass across two sides. In this case the tires can be shipped standing vertical and stacked horizontally assuming sufficient vertical clearance is maintained in most containers and closed trailers the vertical height is between 90 and 110 inches general while the width is 90 to 96 inches for standard width trailers and containers. Naturally the elongated oval shape means the longest dimension is increased by an amount at least as much as the amount of diametrical compression and in such a case the recommended way to ship the tire in the compressed state is to orient the elongated length in the lengthwise direction of the trailer or container whether shipped vertically or horizontally.

Preferably the compression of the carcass is such that the elongated sides of the tread belt are substantially straight sided or convexly curved. Alternatively, the tread belt can be compressed beyond straight sided resulting in a somewhat bow tie shape. Naturally, the amount of compression is recommended to be generally as small as needed to comply with the shipping constraints.

In another aspect the tire is compressed by holding four diametrical sides thereby reducing the opposite sides to form a substantially rectangular or square tire for shipping.

According to one aspect of the invention, the very large tires have a removable tread belt and the tread belt is shipped encircling the tire carcass. The removable tread belt is held in a compressed state for shipping, thereby having a significantly-reduced diameter for ease of shipping by using the tire carcass as deformable spacer.

According to this aspect of the invention, the deformable carcass spacer is provided for the compressed tread belt forming the tread belt into an elongated oval shape. The assembly of oval shaped tread belt encircling the compressed tire in a reduced dimensional state for shipping can create gaps between one or both ends of the elongated oval tread belt and the carcass.

According to an aspect of the invention, at least some of the tread belts are stored in a compressed state, thereby further reducing storage space requirements.

Other objects, features and advantages of the invention will become apparent in light of the following description thereof

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in the drawings may be illustrated not-to-scale, for illustrative clarity. The cross-sectional views, if any, presented herein may be in the forms of "slices", or "near-sighted" cross-sectional views, omitting certain background lines which would otherwise be visible in a true cross-sectional view, for illustrative clarity.

Elements of the figures are typically numbered as follows. The most significant digits (hundreds) of the reference number correspond to the figure number. Elements of FIG. 1 are typically numbered in the range of 10–199. Elements of FIG. 2 are typically numbered in the range of 10–399. Similar elements throughout the drawings may be referred to by similar reference numerals. For example, the element 199 may be referred to individually as 199a, 199b, 199c, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein.

DEFINITIONS

"Bead" means that part of the tire comprising an annular tensile member wrapped by the ply cords and shaped, with or without other reinforcement element such as flippers, chippers, apexes, toe guards and chafer, to fit the wheel rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect of the equatorial plane of the tire.

"Bias ply tire" means a tire having a carcass with reinforcing cords in the carcass ply extending diagonally across the tire from bead core to bead core at about 25–50 angle with respect to the equatorial plane of the tire. Cords run at opposite angles in alternate layers.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Footprint" means the contact patch or area of contact of the tire tread with a flat surface under load and pressure.

"Lateral" and "laterally" means lines or directions that are parallel to the axis of rotation of the tire (also "axial").

"Normal inflation pressure" refers to the specific design inflation pressure at a specific load assigned by the appropriate standards organization for the service condition for the tire.

"Ply" means a continuous layer of rubber-coated parallel cords.

"Radial" and "radially" means directions extending radially toward or away from the axis of rotation of the tire.

"Radial-ply tire" means a belted or circumferentially-restricted pneumatic tire in which the ply cords which extend from bead to bead are laid at cord angles between 65 degrees and 90 degrees with respect to the equatorial plane of the tire.

"Zero-degree wires" means at least one layer of parallel cords (usually metal wire), underlying the tread, unanchored to the bead, spiraling circumferentially around the tread, and having cord angles in the range from 9 degrees to 5 degrees with respect to the equatorial plane of the tire.

DETAILED DESCRIPTION OF THE INVENTION

One application of the method of this invention is used with a tread belt 12 and separate carcass 14 assembled to form a very large tire 10 (such as tires greater than 120 inches (3.05 meters) in diameter as used on earthmover-type very large vehicles). The method is not dependent on a particular design for the removable tread belt 12 and matching carcass 14. Although a specific very large tire design is described herein below for illustrating the embodiment of this inventive method, the inventive method should not be limited to this particular tire design.

Figure 1A:
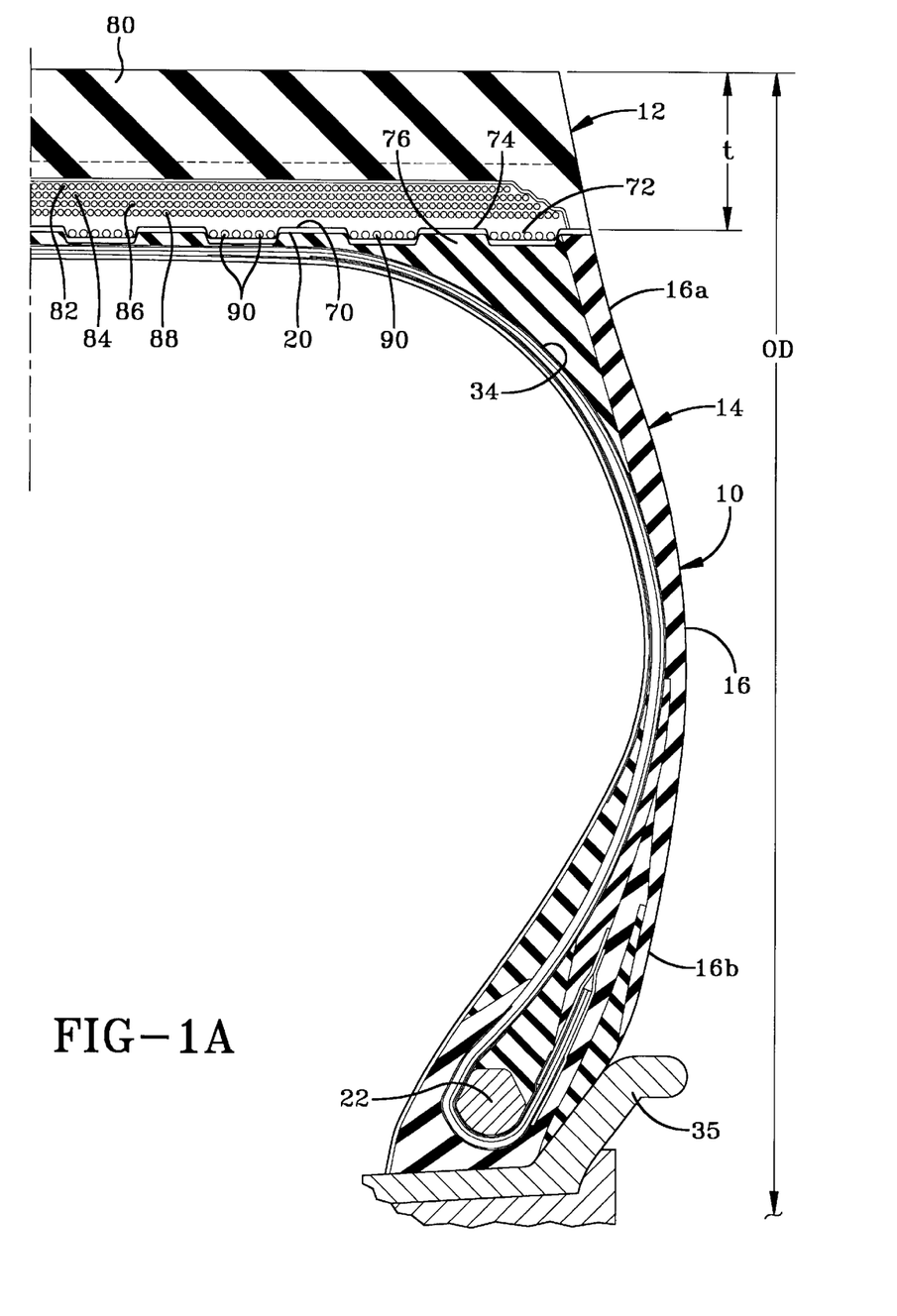
FIG. 1A is a cross-sectional view illustrating half of a portion of a removable tread belt tire, according to the invention with optional grooves.
Figure 1B:
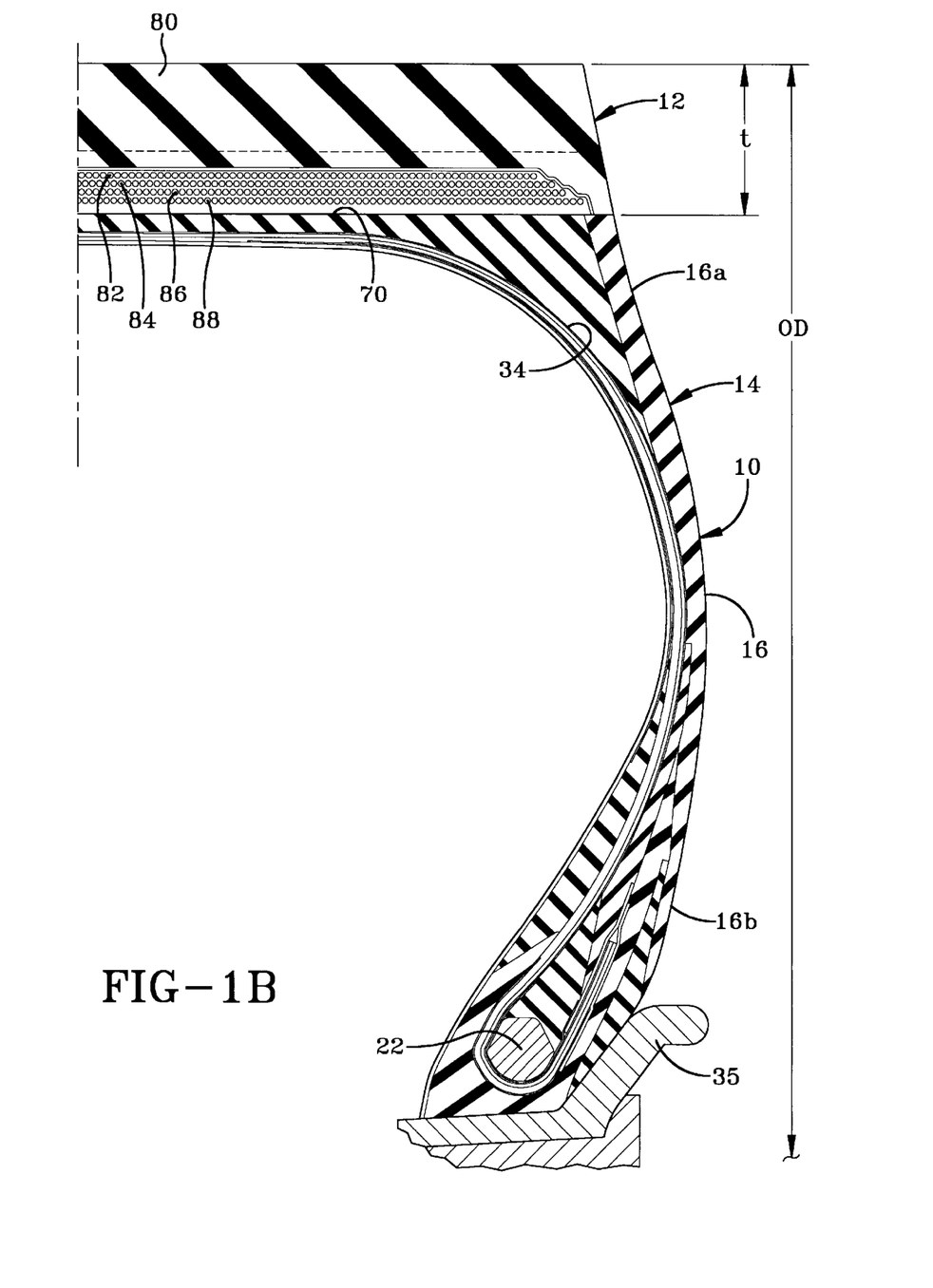
FIG. 1B is a cross-sectional view illustrating half of a portion of a second embodiment of a removable tread-belt tire without optional grooves according to the invention.

FIG. 1B illustrates a cross-section of a portion of a very large tread belt pneumatic tire 10 which in the specific embodiment illustrated is a size 70/68R63 earthmover tires. The size 70/68R63 tires has a 162 inch (411,42 cm) maximum inflated outside diameter (OD), a 70.0 inch (177.80 cm) maximum inflated width in the axial direction, and a nominal bead diameter of 63 inches (160.0–2 cm). The tread belt 12 has a thickness (t) of approximately 10 inches (254 cm), and a width of approximately 60 inches (1,651 cm). The assembled tire 10 weighs 16,000 pounds (7,256 kg), of which approximately 8,000 pounds (3,628 kg) are in the removable tread belt 12. The tire carcass 14 is typically inflated to a pressure of about 100 pounds per square inch (686 kPa) with air and sometimes with an air/nitrogen mixture. The very large tread belt pneumatic tire 10 includes a ground engaging, circumferentially extending tread belt 12 mounted on a radially reinforced, beaded tire carcass 14. The beaded tire carcass 14 generally includes a pair of tire sidewalls 16 extending radially inwardly form the outer circumferential surface 20 of the tire carcass 14 and terminating at a pair of bead wires 22. The sidewalls 16 each have an upper portion 16a in the shoulder region of the tire carcass 14 and radially outward of the maximum section width of the tire carcass 14, and a lower portion 16b, adjacent the bead wires 22, and radially inward of the maximum section width of the tire carcass 14.

Most details of the tire carcass 14 construction are not relevant to the method of this invention, and will not be described other than to note that the carcass 14 generally contains at least one rubberized laminated ply layer 34 of tire cord fabric. The carcass 14 mounts on the wheel mounting rim 42, pneumatically sealing the area of the bead 22 against, and held in place by, the flange 35, which is generally removable from the rim 42 on wheels used for very large tires 10.

An optional feature is generally included in removable tread belt tires 10 in order to assist in holding the removable tread belt 12 in place on the carcass 14. This optional feature, illustrated in FIG. 1A, comprises a set of one or more grooves 78 and one or more lands 76 formed in the outer circumferential surface 20 of the carcass 14.

The ground engaging, circumferentially extending tread belt 12 is removably mounted onto the tire carcass 14. At a minimum, the tire tread belt 12 comprises a tread portion 80, and at least one belt 82, 84, 86 and/or 88 (82–88) or set of zero-degree wires 90 which encircle the tire tread and are provided to restrict the radially outward growth of the tread belt 12. The placement and shape of the wires 90 and/or the belts 82–86, are the subject of other patents, and are not critical to the method of this invention.

An optional feature of the tread belt 12 embodiment illustrated in FIG. 1A comprises one or more annular lands 72 and one or more annular grooves 74 in the underside or inner circumferential surface 70 of the tread belt 12 the interlock with corresponding grooves 78 kP and lands 76 of the tire carcass 14 to restrain the tread belt 12 from the lateral or axial movement with respect to the carcass 14.

Certain safety regulations within a particular country, state, county, and municipalities dictate where large loads can be transported. Oversized loads having extended lengths or extra wide widths or excessive weights require special permits and in some cases, depending on the road-oversized loads are simply prohibited from travel. Police escorts and travel restriction are common for oversized loads particularly in the United States. The U.S. interstate highway system sets certain standards for transportation of commercial goods. Title 49 of United States Code Service is the Transportation code 49 USC §31111 Subchapter II Length and Width Limitation defines the semi-trailer operating in a truck tractor semi trailer combination cannot be limited by state regulation to less than 48 feet in length and 102 inches in width when traveling on the Federal Interstate Highway system. The individual states can grant special use permits for widths greater than 102 inches. This regulation clearly makes it advantageous to insure all shipping of loads fit within these standards. The restrictions on oversized loads are costly and burdensome. Accordingly, being able to ship products within the more conventional standards is a far superior way, in some cases the only way to transport.

Another practical problem in transporting large loads is vertical clearance limitation generally bridges and overpasses allow for 14 feet of clearances on interstate highways. In cities and off the interstate highway system clearances vary widely. Most commercial trucks with closed trailers have about 110 inches of vertical storage. As a general rule flat bed trucks must allow for bridge clearances to be sufficient along the route of travel.

The present invention method of transporting very large tires can take advantage of width, length and vertical height limitations and enable tires otherwise too large for standard shipment to be able to fit within these restrictions.

In the related patent application Ser. No. 09/517,211, the same inventor taught a novel way of shipping a two piece tire 10 having a tread belt 12 and a carcass 14 as separated components. The advantage yielded a combination that could fit on a standard size trailer for transport. The tread belt 12 was mounted over a spacer and flattened into a straight-sided oval. Alternatively the carcass 14 separate from the tread belt 12 could also be compressed on opposing sides as needed.

Figure 4A:
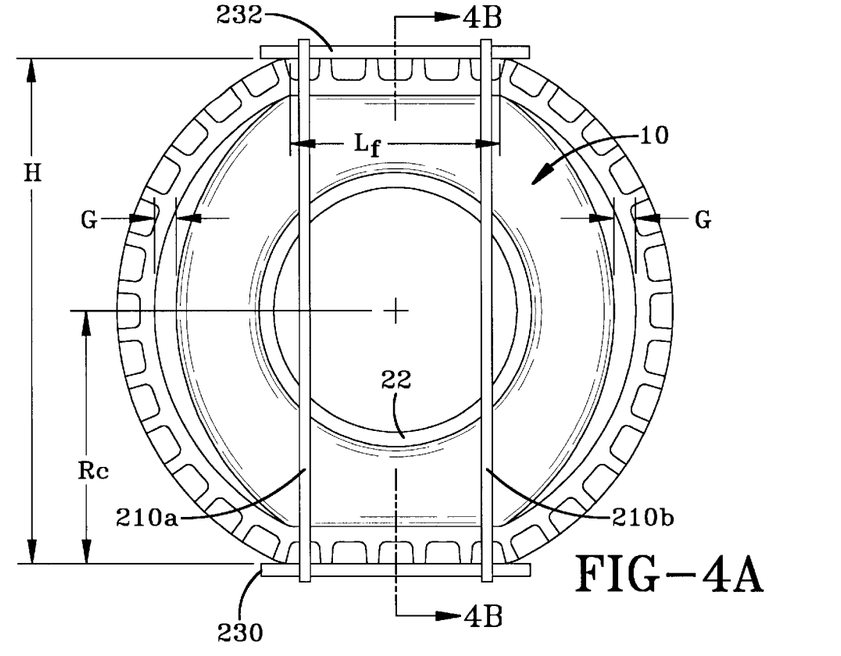
FIG. 4A is a side view of a two piece tire with removable tread belt prepared for shipping according to the invention.
Figure 4B:
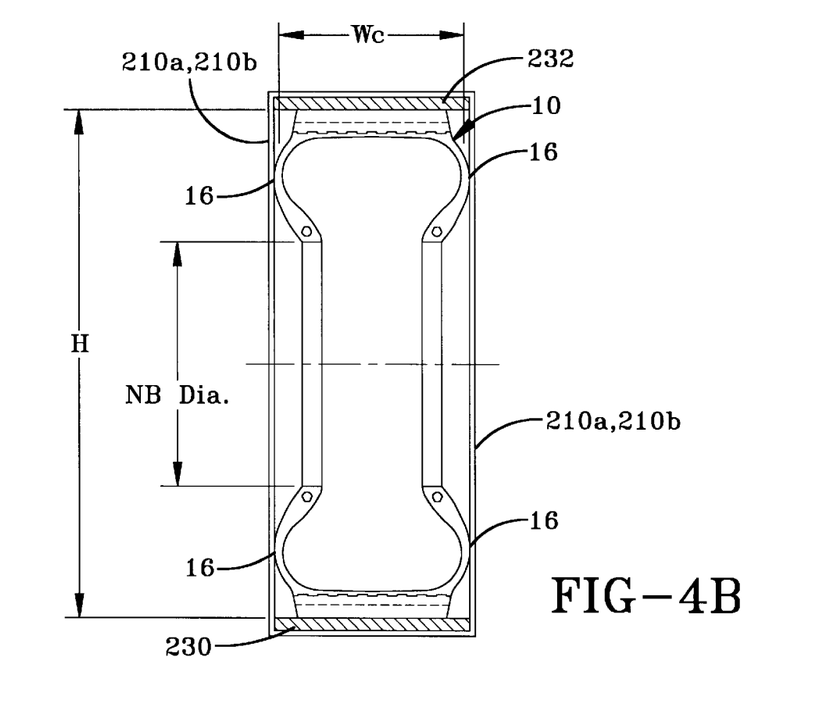
FIG. 4B is a cross-sectional view of the two piece tire prepared for shipping of FIG. 4A.

The present invention teaches the assembled tire 10 can be compressed to fit within either the vertical limitation or the width limitation of a standard size load and then shipped in the compressed state. In the case of the very large two-piece tire 10 the encircled carcass 14 and the tread belt 12 are compressed wherein the carcass 14 acts as a spacer for the tread belt 12 as shown in FIGS. 4A and 4B. Due to the fact that the tread belt 12 is free of the carcass 14 as the tire assembly is compressed means the non-compressed portions of the carcass 14 and the tread belt 12 can elongate. The cords in the carcass 14 limit the amount of expansion but the tread belt 12 can actually locally separate from the carcass 14 as shown creating gaps G between the carcass 14 and the tread belt 12. All of this compression can occur at a very high percentage of compression without damaging the tread belt 12 or the underlying carcass 14. In test it was possible to compress the assembled tread belt/carcass to an amount slightly greater than the nominal bead diameter of the tire as the beads 22 were allowed to spread axially apart as the compression occurred. Normally, in very large tires the amount of compression needed to comply with standard shipping loads or loads sufficient to avoid escorts are much smaller, requiring only small percentages of compression.

Very large amounts of compression are feasible in two piece tires 10 due in part that the carcass 14 needs no restrictive belt structure and the restrictive belt structure 100 in the separate tread belt 12 is free to collapse into an oval shape without flexing the structure in compression. Thus, the belt structure 12 is not in anyway kinked or overly bent and thereby putting the belt cords in compression. Effectively the tread belt 12 can stay flat across the tread width.

In the case of a very large one piece tire 10 the same beneficial shipping advantage can take place however, it is believed that the percentage of compression may be more restricted or limited to prevent tire damage due to the higher strains placed on the belt edges. The present method of compressing these very large tires 10 can work in both the two-piece tires 10 or in a more conventional one-piece tire 10. Heretofore, and prior to the design of these very large tires it has been the practice to not compress the tires for fear of tire damage. The present invention describes several ways in which one or more portions of a tire can be compressed by applying pressure from the tread radially inwardly.

In practicing the invention, the tire is compressed into various smaller dimensions when prepared for shipping.

Figure 2A:
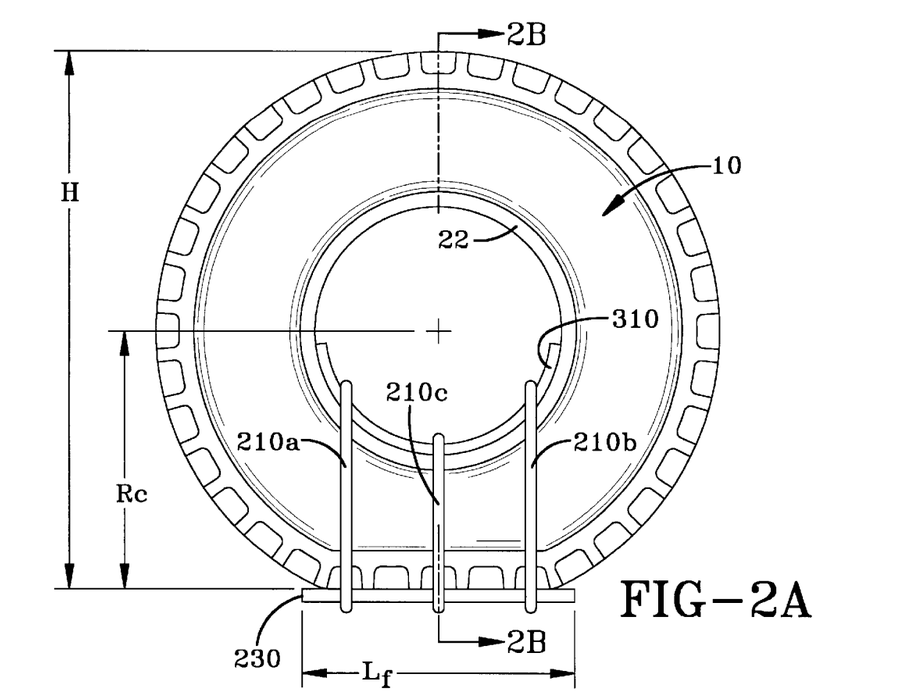
FIG. 2A, is a side view of a tire prepared for shipping, according to the invention.
Figure 2B:
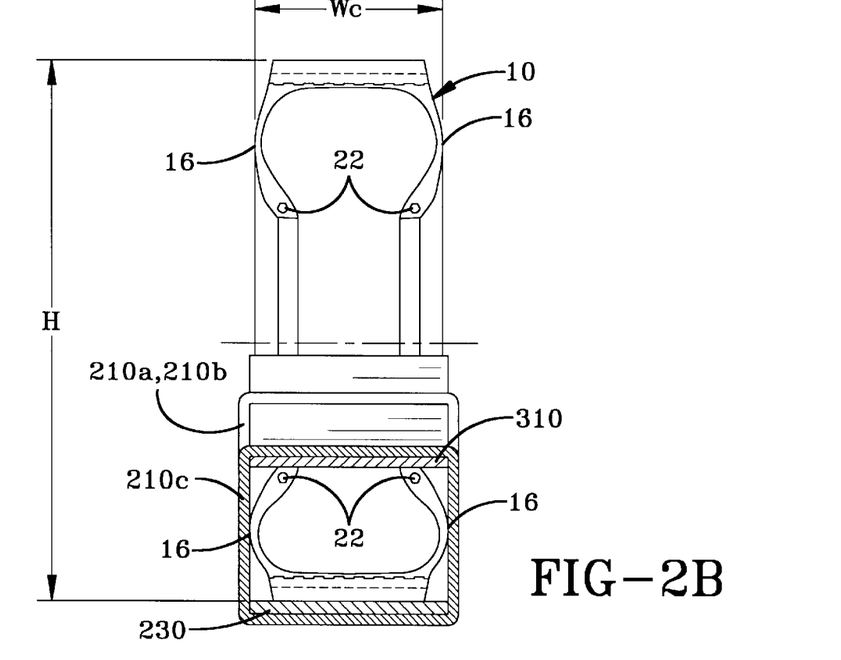
FIG. 2B, is a cross-sectional view of the tire prepared for shipping of FIG. 2A.
Figure 3A:
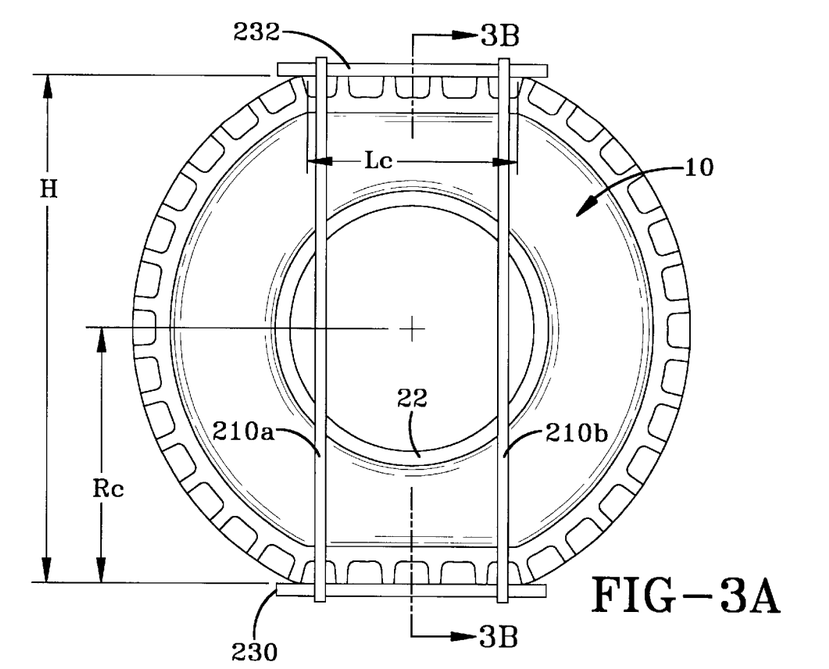
FIG. 3A is a side view of a tire optionally prepared for shipping, according to the invention.
Figure 3B:
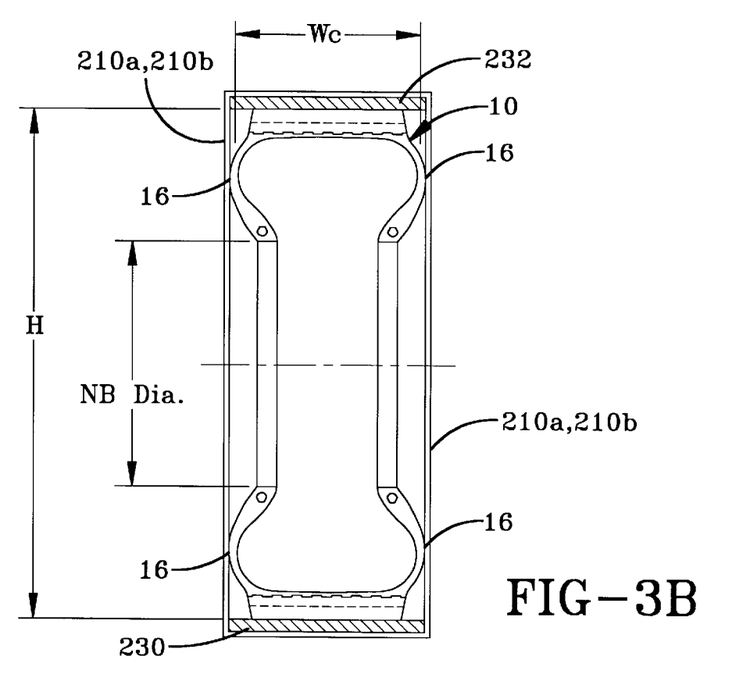
FIG. 3B is a cross-sectional view of a tire optionally prepared for shipping, according to the invention.

In a first embodiment shown in FIG. 2A and 2B, the tire 10 is radially compressed and held in a compressed state by one or more straps 210 (210a, 210b, 210c) made of steel or other suitable shipping strap material such as plastic, fabric, ropes or chains. These straps 210 compress the tread 12 into the underlying carcass 14. As shown the straps can be passed through the beads 22 and by applying a force the beads 22 and the tread 12 come closer together. As shown a bead protector 310 can be used to prevent the strap from cutting into the beads 22. The bead protector 310 can occupy as much as 180 degrees of the bead circumference and thereby permit the defection and compression to occur over a sufficiently large area. The bead protector 310 preferably should overhang the beads to bulge apart to allow improved deflection. As shown the compression of one side of the tire 10 creates a flat side to facilitate vertical shipment of the tires.

For convenience in handling, the compressed tire is preferably strapped onto a bottom pallet 230 of dimensions suitable to support at least the entire footprint, the width W at least the flat-sided length Lf of the compressed tire 10. The pallet 230 is constructed by known techniques and of suitable, known pallet materials, and is designed to be able to sustain expected weights and shipping forces.

Another method involves compressing the tread 12 in two diametrically opposed portions. In this method, the tire is compressed by applying a force across the tread thereby flattening the underlying carcass as shown in the FIGS. 3A, 3B, 4A and 4C. The advantage of this method is the carcass is deflected in two locations permitting the dimensional compression to be double that of the previous described method of FIGS. 2A and 2B.

A top pallet 232, similar to the bottom pallet 230, is shown added about the compressed tread belt 12 and held in place by the straps 210a, 210b. By using two pallets 230, 232 with the straps 210a, 210b encircling below the bottom pallet 230 and above the top pallet 232, the tread belt 12 is protected from the damage by contact with the straps 210a, 210b.

Tires 10 compressed as shown have the bead portions 22 free to bulge out as the underlying carcass is compressed. This ability to bulge outwardly is natural unless restrained. This is believed beneficial to reduce some of the strain on the compressed carcass.

The tires 10 can be stacked vertically by laying such tire horizontally onto the trailer. Alternatively the tires 10 may be aligned in rows sitting vertically. In either case the tires 10 are restrained and tied to the trailer for shipment.

The following table shows the amount of deflection (compressing) required for various tire size.

| Tire OD | Nominal Bead Distance | Compressed Width | % Compression | Compress Vertical | % Compression |
|---|---|---|---|---|---|
| 185 | 75 | 102 | 45% | 110 | 40% |
| 162 | 63 | 102 | 37% | 110 | 32% |
| 120 | 51 | 102 | 15% | 110 | 8% |

As can be seen the tires 10 greater than 120 inches OD require a much higher percentage of compression. Accordingly the tires 10 with 185 inch OD require 75 inches of total deflection. Since the sidewall including the tread 12 and bead 22 are only 55 inches tall, the compression must be from at least two sides and even if shipped vertically a 110 inch dimension is permitted. It is appreciated higher vertical heights can be achieved if the trailer deck is lowered or the bridge clearances permit. Nevertheless, shipping compressed tires having an unrestrained OD of 120 inches or more means the tire is compressed at least 8%. Often times slightly larger widths may be permitted on flatbed trucks. In some cases a few inches overhang locally may be permitted, as is the case in tires of the 120 inch diameter size or less. However, as these tires get ever larger, the amount of tire overhang is too great to permit transport within standard size guidelines absent compression.

In the case of one piece tires the amount of compression in very large tires may be too great to permit compression as seen in the exemplary 185 inch OD sized giant tire. The 162 inch OD sized tire may be reaching a limit in compression for a single molded tire. The two piece tire however, has the capacity to achieve such massive amounts of compression due to the highly flexible underlying carcass 14 and the fact that the tread belt structure 100 is independent of the carcass 14.

Historically, in single piece tires, engineers have avoided flattening the tires along the tread faces in the belief that the tire could be damaged. While this may have been true in smaller tires wherein a few inches of defection would be equal to 50% compression. In the very large tires many inches of compression may only represent a small percentage of compression. Accordingly, these large tires 10 afford an opportunity to save shipping costs while being compressed without the fear of tire damage. The present shipping method has clearly large advantages when used on such tires.

Although the invention has been illustrated and described in detail in the drawing and foregoing description, the same is to be considered as illustrative and not restrictive in character, it being understood that only preferred embodiments have been shown and described, and that all changes and modifications that come within spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of shipping a very large pneumatic tire having an unrestrained outside diameter (OD) over 120 inches, the method characterized by the steps of:

holding at least one side of the tire in a compressed state thereby reducing the distance from the unrestrained outside diameter (OD) of over 120 inches to a maximum distance (H) or less as measured across the at least one side of the tire in a compressed state to an opposing side of the tire, the distance (H) being at least 8% less than the unrestrained outside diameter (OD) of the tire; and shipping the tire in the compressed state.

2. Method of claim 1 further comprises placing the compressed tire on a commercial standard width flat bed trailer or within a commercial standard size trailer or shipping container as specified under Title 49 of United States Code Service Section 3111 Subchapter II.

3. The method of claim 1 wherein the tire is a two piece tire having a removable tread belt encircling a tire carcass, wherein the step of holding at least one side of the tire further includes restraining the tire tread belt so that the two opposite sides of the tread belt are held against the carcass, forming the tread belt into an elongated oval in its compressed state.

4. The method of claim 1 wherein the tire is held along four diameteral sides thereby reducing the distance of opposite sides to form a substantially rectangular or square tire for shipping.

5. The method of claim 1 wherein the step of holding at least one side causes a reduction in the tire diameter OD from over 120 inches (3.05 meter) to the distance H, H being 110 inches or less.

6. The method of claim 1 wherein the step of holding at least one side of the tire includes holding two diametrically opposing sides.

7. The method of claim 1 wherein the step of holding at least one side of the tire, the tire having a tread and a carcass, the carcass having a pair of carcass beads, includes the step of compressing the tread by applying pressure against the tire carcass beads, thereby locally compressing the carcass between the tread and the beads.

8. The method of claim 3 wherein the step of holding the tread belt against the carcass compresses radially inwardly the carcass while the tread belt elongates into an oval forming a gap G between one or both of the elongated ends of the tread belt and the encircled carcass.

* * * * *